United States Patent
Schumacher (10) Patent No.: US 12,226,724 B2
(45) Date of Patent: Feb. 18, 2025

(54) FLUID FILTER FOR A MOTOR VEHICLE AND FILTER CARTRIDGE FOR A FLUID FILTER

(71) Applicant: Daimler Truck AG, Leinfelden-Echterdingen (DE)

(72) Inventor: Eric Schumacher, Stuttgart (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 379 days.

(21) Appl. No.: 17/627,376

(22) PCT Filed: Jul. 13, 2020

(86) PCT No.: PCT/EP2020/069701
§ 371 (c)(1),
(2) Date: Jan. 14, 2022

(87) PCT Pub. No.: WO2021/009094
PCT Pub. Date: Jan. 21, 2021

(65) Prior Publication Data
US 2022/0266178 A1      Aug. 25, 2022

(30) Foreign Application Priority Data
Jul. 15, 2019    (DE) .................... 10 2019 004 927.6

(51) Int. Cl.
*B01D 29/21*    (2006.01)
*B01D 29/96*    (2006.01)
*B01D 35/30*    (2006.01)

(52) U.S. Cl.
CPC ............. *B01D 35/30* (2013.01); *B01D 29/21* (2013.01); *B01D 29/96* (2013.01);
(Continued)

(58) Field of Classification Search
CPC ............ B01D 29/96; B01D 2201/4015; B01D 2265/022; B01D 2265/029
See application file for complete search history.

(56) References Cited

U.S. PATENT DOCUMENTS 3,272,336 A    9/1966   Humbert, Jr.
5,683,478 A    11/1997  Anonychuk
(Continued)

FOREIGN PATENT DOCUMENTS

DE          696 29 208 T2     4/2004
DE       10 2016 212 591 A1   1/2018
(Continued)

OTHER PUBLICATIONS

Waltenberg et al—WO 2014029828 A1 machine translation—Feb. 27, 2014 (Year: 2014).*
(Continued)

*Primary Examiner* — Bradley R Spies
(74) *Attorney, Agent, or Firm* — Crowell & Moring LLP (57) ABSTRACT

A fluid filter for a motor vehicle includes a filter housing and a filter cartridge which is disposable in the filter housing. The filter housing has a housing pot and a covering element where the filter cartridge is connectable to the housing pot by rotating around a longitudinal axis of the filter cartridge. A holding element having a web is disposed on an end plate of the filter cartridge where the web protrudes from a wall of the holding element and where the wall is formed to be spiral shaped radially to the longitudinal axis. The web of the holding element is engageable behind a holding web in a mounting position of the filter cartridge where the holding web projects at a constant distance from a wall, formed to be spiral shaped radially to the longitudinal axis, of a counter bearing disposed on the housing pot.

15 Claims, 12 Drawing Sheets

(52) U.S. Cl.
CPC .......... *B01D 2201/291* (2013.01); *B01D 2201/4015* (2013.01); *B01D 2201/4092* (2013.01); *B01D 2265/022* (2013.01); *B01D 2265/029* (2013.01)

(56) References Cited

U.S. PATENT DOCUMENTS

| | | |
|---|---|---|
| 5,783,076 A | 7/1998 | Albers, Jr. |
| 10,335,722 B2 | 7/2019 | Girondi |
| 2015/0167602 A1 | 6/2015 | Waltenberg et al. |

FOREIGN PATENT DOCUMENTS

| | | |
|---|---|---|
| EP | 0 221 675 B1 | 5/1987 |
| EP | 1 938 882 A1 | 7/2008 |
| IT | 201600097797 A1 | 3/2018 |
| JP | 2015-159732 A | 9/2015 |
| KR | 10-2017-0007743 A | 1/2017 |
| WO | WO 2008/030707 A1 | 3/2008 |
| WO | WO 2014/029828 A1 | 2/2014 |
| WO | WO 2015/173624 A1 | 11/2015 |
| WO | WO 2018/067437 A1 | 4/2018 |

OTHER PUBLICATIONS

PCT/EP2020/069701, International Search Report dated Aug. 31, 2020 (Three (3) pages).
U.S. Patent Application, "Fluid Filter for a Motor Vehicle and Filter Cartridge for Such a Fluid Filter", filed Jan. 14, 2022, Inventor Eric Schumacher.
Portuguese-language Brazilian Office Action issued in Brazilian Application No. BR112022000605-5 dated Sep. 18, 2024, with partial English translation (5 pages).

* cited by examiner

FLUID FILTER FOR A MOTOR VEHICLE AND FILTER CARTRIDGE FOR A FLUID FILTER

BACKGROUND AND SUMMARY OF THE INVENTION

The invention relates to a fluid filter for a motor vehicle, having a filter cartridge which is arranged in a filter housing of the fluid filter. The filter housing comprises a housing pot and a covering element. The filter cartridge has a filter material. The filter cartridge is connected to the housing pot of the filter housing by rotating around a longitudinal axis of the filter cartridge. Furthermore, the invention relates to a filter cartridge for such a fluid filter.

Fluid filters, such as oil filters, for example, which are arranged in a filter housing which comprises a housing pot and a housing cover are known from motor vehicle construction. After unscrewing the housing cover from the housing pot, the filter can be installed in the filter housing. There are different attachment solutions for fixing the housing cover to the housing pot.

DE 696 29 208 T2 discloses a fuel filter arrangement having a support plate in the lower portion of the corresponding filter housing on which a ring filter element rests. A contaminant container is attached below the support plate. The support plate has a horizontal and flat spiral liquid passage, by means of which the filter housing is connected to the contaminant container. The ring filter element inserted into the fuel filter is centered and held on its upper end by a tubular connection that is central on the covering plate of the filter housing and encapsulated by a seal.

DE 10 2016 212 591 A1 describes a liquid filter device in which a ring filter element arranged in the filter housing separates a pure side from a crude one. A bypass valve is provided on a lower end pane of the ring filter element. Spiral-segment shaped current guiding elements are attached, for example, on the end pane to deflect the current of the liquid. In this construction too, the ring filter element inserted into the filter housing is held in a centered manner by a central drainage pipe in the housing cover.

U.S. Pat. No. 3,272,336 shows an oil filter opening, the ring filter insert of which having spiral-segment shaped ribs by means of which the inflowing crude oil is put in spiral motion in order to cause a centrifugally effective precipitation of heavy contaminative particles which are led into a contaminant container at the bottom of the filter housing of the oil filter device.

Furthermore, EP 0 221 675 B1 describes a fluid filter formed as an oil filter. The fluid filter is screwed together to a filter bracket formed on an engine. For this, four inwardly projecting lugs are formed on an inside of a wall of a housing of the fluid filter. Four lugs are also provided on sides of the filter bracket, the lugs, however, accordingly projecting outwardly in relation to a central axis of the fluid filter. The inwardly projecting lugs are inserted between the outwardly protruding lugs for mounting the fluid filter. The fluid filter is then rotated a little further, such that the inwardly projecting lugs engage behind the outwardly projecting lugs.

Here, the situation in which the fluid filter has to be positioned very accurately in relation to the filter bracket in order to be able to correctly fix the fluid filter on the filter bracket is to be seen as disadvantageous.

Furthermore, it is disadvantageous that the lugs serving as locking elements can confer holding forces only across half of a periphery of the housing of the filter cartridge. This is because, for mounting and dismounting, it is necessary to ensure that the four lugs provided on sides of the filter cartridge do not overlap with the four lugs provided on sides of the filter bracket.

The object of the present invention is thus to create a fluid filter of the kind mentioned above in which a particularly simple mounting of the filter cartridge is achieved, and to specify a filter cartridge that can be correspondingly simply mounted.

The fluid filter according to the invention for a motor vehicle comprises a filter cartridge which is arranged in a filter housing of the fluid filter. The filter housing comprises a housing pot and a covering element. The filter cartridge has a filter material. The filter cartridge can be connected to the housing pot of the filter housing by rotation around a longitudinal axis of the filter cartridge. A holding element is arranged on an end plate of the filter cartridge, the holding element comprising a web. The web protrudes from a wall of the holding element. The wall of the holding element is formed to be a spiral radially to the longitudinal axis. In a mounting position of the filter cartridge, the web of the holding element engages behind a holding web. The holding web protrudes from a spiral wall radial to the longitudinal axis of a counter bearing arranged on the housing pot.

Thus, the spiral holding element in the direction of the longitudinal axis is provided on sides of the filter cartridge and the spiral counter bearing in the direction of the longitudinal axis on sides of the housing pot of the filter housing. In doing so, a particularly simple mounting of the filter cartridge is achieved. This is because the web of the holding element of the filter cartridge only needs to be positioned in relation to the holding web of the counter bearing in such a way that, as a result of rotating the filter cartridge around the longitudinal axis of the filer cartridge, the web of the holding element engages behind the holding web of the counter bearing.

On the one hand, rotating the filter cartridge around the longitudinal axis leads to the filter cartridge being connected to the housing pot or such a first housing part of the filter housing in the mounting position of the filter cartridge. On the other hand, a correct alignment of the filter cartridge in relation to the filter housing is thus achieved. After the undercut connection of the exchange part in the form of the filter cartridge with the housing pot of the filter housing, the covering element or the cover or such a second housing part of the filter housing can be mounted in order to seal the filter housing of the fluid filter.

In particular when mounting overhead, the filter cartridge accordingly does not have to be fixed by hand or by means of auxiliary means, before the covering element is connected to the housing pot of the filter housing. This is because the filter cartridge already holds on to the housing pot by means of the rear engagement of the holding web. When installing the filter cartridge in the filter housing overhead, there is thus a positional fixing of the filter cartridge as soon as the holding element, having the spiral shape, of the filter cartridge is connected to the counter bearing having the spiral shape, the counter bearing being provided on sides of the housing pot. Depending on the design of the holding element, a length of the spiral-shaped holding element can—in contrast to a bayonet closure, for example—be greater than half the periphery of the filter cartridge or even greater than the periphery. Thus, a particular secure and tightly fitting placement of the filter cartridge on the filter housing can be achieved.

As a result of the design of the holding element with the spiral formed wall and the web protruding from the wall in the manner of a flange, the holding element is formed to be hooked in terms of cross-section, such that a clamping geometry and holding geometry is provided by the holding element. In particular, the web of the holding element serving as clamping geometry or holding geometry is presently replaced together with the filter cartridge when exchanging the filter cartridge. Thus, it can be taken into account that the holding element of the filter cartridge is subject to wear.

Due to the flat or planar design of the connection described here of a filter cartridge to the filter housing or between the counter bearing and holding element, in which the holding web of the counter bearing on the side of the housing and the web of the holding element on the side of the filter cartridge are each attached at a constant spacing apart from the base of the filter housing pot or from the end plate of the cartridge, a particularly large amount of constructive space is available inside the filter housing, which can be occupied by the filter material in the filter cartridge. When placing a filter cartridge on a housing pot by screwing a screw element of the filter cartridge into a receiver provided on sides of the housing pot and having a corresponding thread, there would be comparatively less constructive space available in the direction of the longitudinal axis of the filter cartridge, which could be occupied by the filter material of the filter cartridge.

Depending on the intended use and design of the fluid filter, different fluids can be filtered by means of the filter material of the filter cartridge. Thus, the fluid filter can be formed as an air filter of an air conditioning system or ventilation system of the motor vehicle, by means of which ambient air can be filtered before its emergence into a passenger chamber of the motor vehicle. The fluid filter can, however, also be formed as an air filter of an internal combustion engine of the motor vehicle or as a filter for filtering fuel. Furthermore, it is possible that the fluid filter is formed as an oil filter or as a water precipitator for separating water from a lubricant and/or a fuel. Moreover, it is possible that the fluid filter is formed as an air dryer, by means of which the moisture in a system containing air, in particular pressurised air, of the motor vehicle, for example the pressurised air in a braking system, can be reduced.

The counter bearing is preferably formed integrally with the housing pot. In this way, a particularly robust counter bearing can be provided on sides of the filter housing.

In particular, the housing pot can have a base and a jacketing wall. The counter bearing is then preferably formed integrally with the base of the housing pot. Accordingly, with the filter cartridge installed in the filter housing, the end plate of the filter cartridge, on which the holding element is arranged, is in great proximity to the base of the housing pot. As a result, a lot of space in the direction of the longitudinal axis of the filter cartridge can then be occupied inside the filter housing by the filter material. This leads to a low loss of pressure when a fluid ingresses through the filter material.

The housing pot can have a receiver for at least one protrusion arranged on the covering element. In doing so, by the at least one protrusion engaging in the receiver, a mounting orientation of the covering element in relation to the housing pot is predetermined. This is conducive to a precise and process-safe application of the covering element on the housing pot.

It has been shown to be further advantageous when a groove is formed on the covering element in which a front-end edge of a wall of the housing pot is received when the covering element is mounted on the housing pot. In this way, a tight placement of the covering element or cover on the housing pot of the filter housing can be achieved. This applies in particular when a sealing element is additionally arranged on a ground of the groove and/or on the front-end edge of the wall.

The filter cartridge according to the invention for a fluid filter of a motor vehicle can be arranged in a filter housing of the fluid filter, which comprises a housing pot and a covering element. The filter cartridge has a filter material. The filter cartridge can be connected to the housing pot of the filter housing by rotating around a longitudinal axis of the filter cartridge. A holding element with a web is arranged on an end plate of the filter cartridge. The web protrudes from a wall of the holding element. The wall of the holding element is formed to be spiral shaped radially to the longitudinal axis. The web of the holding element is formed to engage behind a holding web in a mounting position of the filter cartridge. The holding web protrudes from a wall which is spiral shaped radially in relation to the longitudinal axis of a counter bearing arranged on the base of the housing pot.

Such a filter cartridge can be particularly simple to mount by it being ensured that the web of the holding element engages behind the holding web of the counter bearing. This can be achieved by rotating the filter cartridge around the longitudinal axis of the filter cartridge. As a result of the holding web of the counter bearing engaging behind with the web of the holding element of the filter cartridge, a fixing of the filter cartridge on the housing pot can be achieved before the covering element is connected to the housing pot and the filter housing of the fluid filter is thus closed. This is particularly advantageous when the filter cartridge is installed overhead, i.e., is to be fixed overhead on the housing pot.

As already stated above in relation to the fluid filter or the fluid filter device in its entirety, due to the flat or planar design of the connection of the counter bearing of the filter housing to the holding element of the filter cartridge, in which the holding web of the counter bearing and the web of the holding element are each attached at a constant distance apart from the base of the housing pot or from the end plate of the filter cartridge, there is a particularly large amount of constructive space available for use by filter material. This means a distance of the web of the holding element is constant in the peripheral direction from a surface of the end plate facing away from the filter material or in the peripheral direction of the filter cartridge. The filter cartridge can have a channel, in particular, which is surrounded in the radial direction at least regionally by the filter material of the filter cartridge. A longitudinal axis of the channel then preferably coincides with the longitudinal axis of the filter cartridge. As a result of such a filter cartridge, comparatively well-defined current paths can be predetermined for the fluid when flowing through the filter cartridge.

Preferably, the filter cartridge has at least one fixing eye in an end region opposite the holding element, in which fixing eye a fixing element can be inserted for fixing the covering element on the filter cartridge. The fixing element can here by guided through the through opening, which is formed in the covering element. By providing the at least one fixing eye on sides of the filter cartridge, it can be ensured that the covering element can only be connected to the housing pot when a filter cartridge is actually installed in the filter housing. This is because, in contrast to via the filter housing, the covering element can not be connected to the housing pot of the filter housing. The at least one fixing eye thus also serves to indirectly fix the covering element on the housing pot of the filter housing via the filter cartridge.

As a result of this design of the filter cartridge, it can thus be achieved that the fluid filter can only be operated with the filter cartridge installed. This is because a mounting of the covering element or housing cover is then not possible without arranging the filter cartridge in the filter housing. In this way, it can be ensured that the fluid to be filtered is also actually cleaned when the fluid filter is in operation due to it passing through the filter material or filter medium of the filter cartridge. In addition, it can be ensured in such a way that an installation of the filter cartridge is not accidentally forgotten.

Furthermore, it is advantageous here that the at least one fixing element that can be introduced into the fixing eye is thus mostly arranged inside the filter housing when the covering element is connected to the housing pot. This is because there is not constructive space claimed by such a fixing element outside the filter housing, the fixing element being formed as a fixing screw in particular. Thus, there is more constructive space available, for example in the engine chamber of the motor vehicle.

The at least one fixing eye can be provided by a hole formed in a base. Sufficient material for forming the hole then only needs to be provided in the region of the base. This is advantageous in terms of a low weight of the filter cartridge.

The base can have a thread, for example when the fixing element is formed as a fixing screw. However, it can also be provided that the fixing screw cuts or gouges a thread into the base when the fixing screw is rotated into the hole. Providing a thread formed only when screwing the fixing screw into the hole is presently unproblematic, since the filter cartridge and thus the at least one fixing eye is replaced when the filter performance of the filter cartridge subsides. Problems associated with the attrition of a self-gouging or self-cutting thread are presently avoided.

A particularly good placement of the fixing element in the at least one fixing eye can be achieved when the fixing eye is provided by a blind hole formed in the base.

Preferably, the at least one base is formed integrally with a further end plate of the filter cartridge. Thus, the base can be provided with particular minimal effort and in a robust or resilient manner.

The further end plate can have a through-passage, in particular, which corresponds to a channel of the filter cartridge. The channel can be surrounded, in the radial direction, at least regionally by the filter material of the filter cartridge. Medium to be filtered can reach the channel via this through-passage when the medium or fluid is cleaned when outwardly passing through the filter material of the filter cartridge in the radial direction. In contrast, when the unfiltered medium or fluid enters the channel from the outside towards the inside through the filter material, the through-opening provided in the further end plate can be provided as an outlet for the filtered fluid or filtered medium.

Preferably, the filter cartridge has a plurality of fixing eyes. In this way, a defined mounting position of the covering element on the housing pot can be predetermined. In addition, an equal force supply when fixing the covering element on the filter cartridge can thus be achieved by means of a corresponding plurality of fixing elements. This applies in particular when the fixing eyes are equally spaced apart from one another in the peripheral direction of the filter cartridge.

Preferably, a curvature radius of the holding element increases from a center of a spiral shape of the wall of the holding element to an edge of the spiral shape. Thus, when fixing the filter cartridge on the housing pot, the filter cartridge can firstly be rotated particularly easily around the longitudinal axis. With increasing rotation around the longitudinal axis and thus bringing the filter cartridge into the mounting position, the web of the holding element then engages increasingly further behind the holding web of the counter bearing. This makes it possible for a person undertaking the mounting of the filter cartridge, for example a mechanic, to be able to establish that the filter cartridge has reached the mounting position. Nevertheless, the filter cartridge can firstly rotate very slightly around the longitudinal axis of the filter cartridge. And in the mounting position of the filter cartridge, a very resilient fixing of the filter cartridge on the housing pot can be achieved or is achieved.

Preferably, the holding element is formed integrally with the end plate of the filter cartridge. Thus, the holding element can be provided in a simple and cost-effective manner. In addition, the required robustness or resilience can thus be provided to the holding element in a simple manner.

The end plate of the filter cartridge can be formed to be closed in particular. Thus, the end plate can withstand a tensile strength particularly well which can act on the web of the holding element of the filter cartridge when the filter cartridge is arranged in the filter housing.

Preferably, a stop is formed on an outer end of the holding element, the stop being able to be brought into abutment with an outer end of the counter bearing by rotating the filter cartridge around the longitudinal axis. Thus, it can be easily conveyed to a person undertaking the mounting of the filter cartridge in the filter housing, for example a mechanic, when then filter cartridge has reached the mounting position. Namely, this is case when the stop, which is formed on the outer end of the holding element in relation to the spiral shape of the wall of the holding element, abuts on the outer end of the counter bearing.

A channel of the filter cartridge which is surrounded in the radial direction at least regionally by the filter material of the filter cartridge, can be formed as a support tube, which has a plurality of passage openings. In this way, the channel ensures that the filter material surrounding the channel is not collapsed or the filter material is supported when medium or fluid to be filtered passes through via the passage openings into the inside of the support pipe. Thus, the filter cartridge can fulfil its filter function for a particularly long time.

It has been shown to be further advantageous when an end region of a channel of the filter cartridge extends beyond a further end plate of the filter cartridge in the direction of the longitudinal axis. The channel is surrounded at least regionally by the filter material of the filter cartridge in the radial direction. In doing so, a tubular support of the covering element can be introduced into the end region of the channel. In this way, the application of the covering element on the housing pot of the filter housing can be accomplished particularly easily. This is because the end region, extending beyond the end plate of the filter cartridge, of the channel predetermines a position of the covering element when mounting.

The holding element can have a plurality of apertures in the peripheral direction of the filter cartridge. In other words, the holding element having the spiral shape does not need to be formed as a continuous spiral. Instead, individual sections can form the spiral shape radially to the wall of the holding element spiral shaped in relation to the longitudinal axis. Accordingly, the web protruding from the wall is also not formed continuously, but each section of the wall has a web section of the holding element protruding from this section. However, the sections of the wall then also depict the spiral shape, such that the wall of the holding element having apertures is formed in a spiral shape. Such an unbroken or segmented spiral shape of the holding element is advantageous in terms of a low weight of the filter cartridge.

The advantages and preferred exemplary embodiments described for the fluid filter according to the invention also apply to the filter cartridge according to the invention and vice versa.

Further advantages, features and details of the invention emerge from the below description of preferred exemplary embodiments and by means of the drawings. The features and feature combinations mentioned above in the description and the features and feature combinations mentioned below in the description of the figures and/or shown only in the figures can be used not only in the respectively specified combination, but also in other combinations or on their own without leaving the scope of the invention.

DETAILED DESCRIPTION OF THE DRAWINGS

Figure 1:
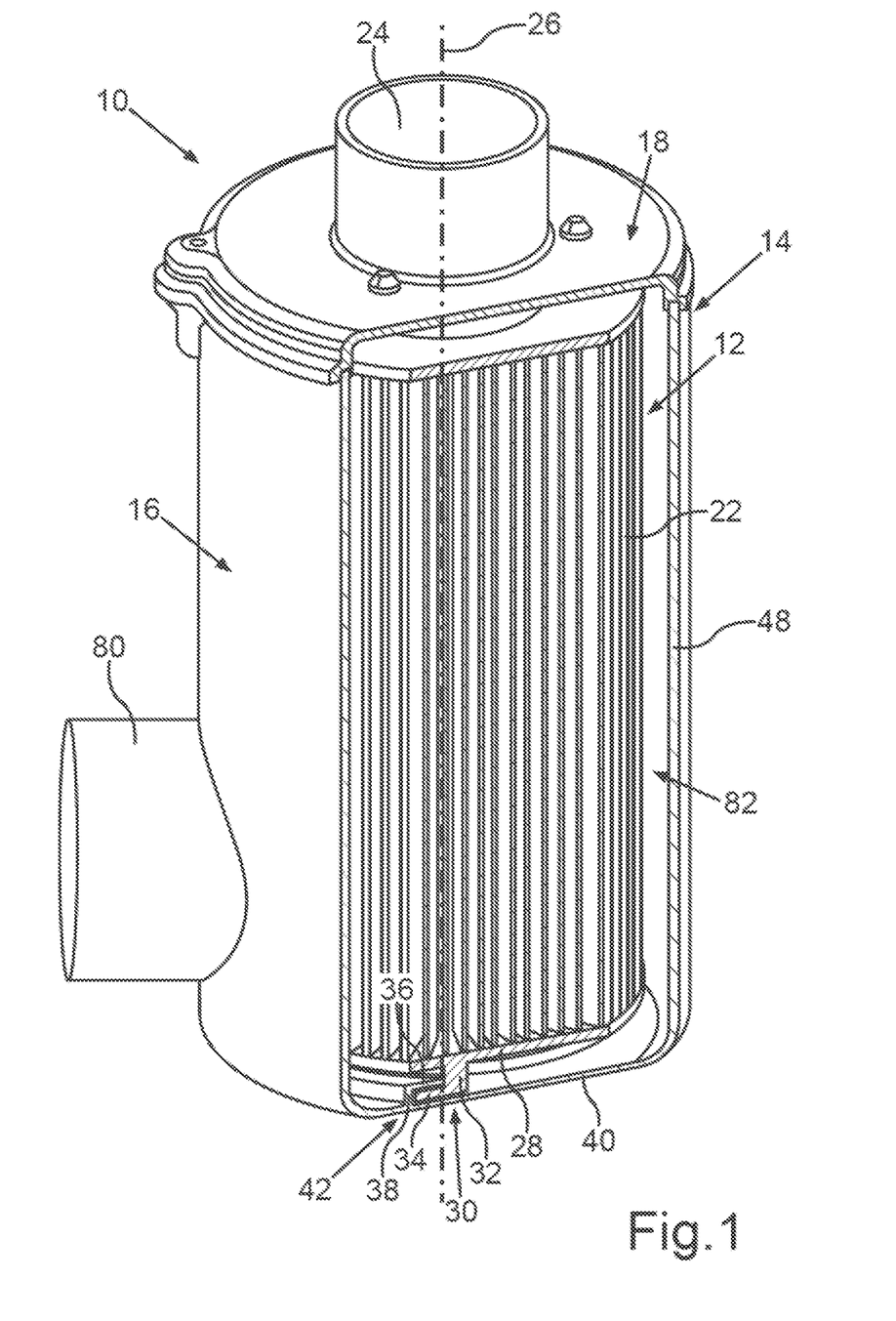
FIG. 1, in a partially cut-out perspective view, shows a fluid filter formed as an air filter for a motor vehicle.

In FIG. 1, a fluid filter 10 for a motor vehicle is shown in a cut-out perspective view, the fluid filter being formed as an air filter by way of example. The fluid filter 10 can, however, also be formed as a fuel filter, as an oil filter or similar fluid filter 10.

Figure 11:
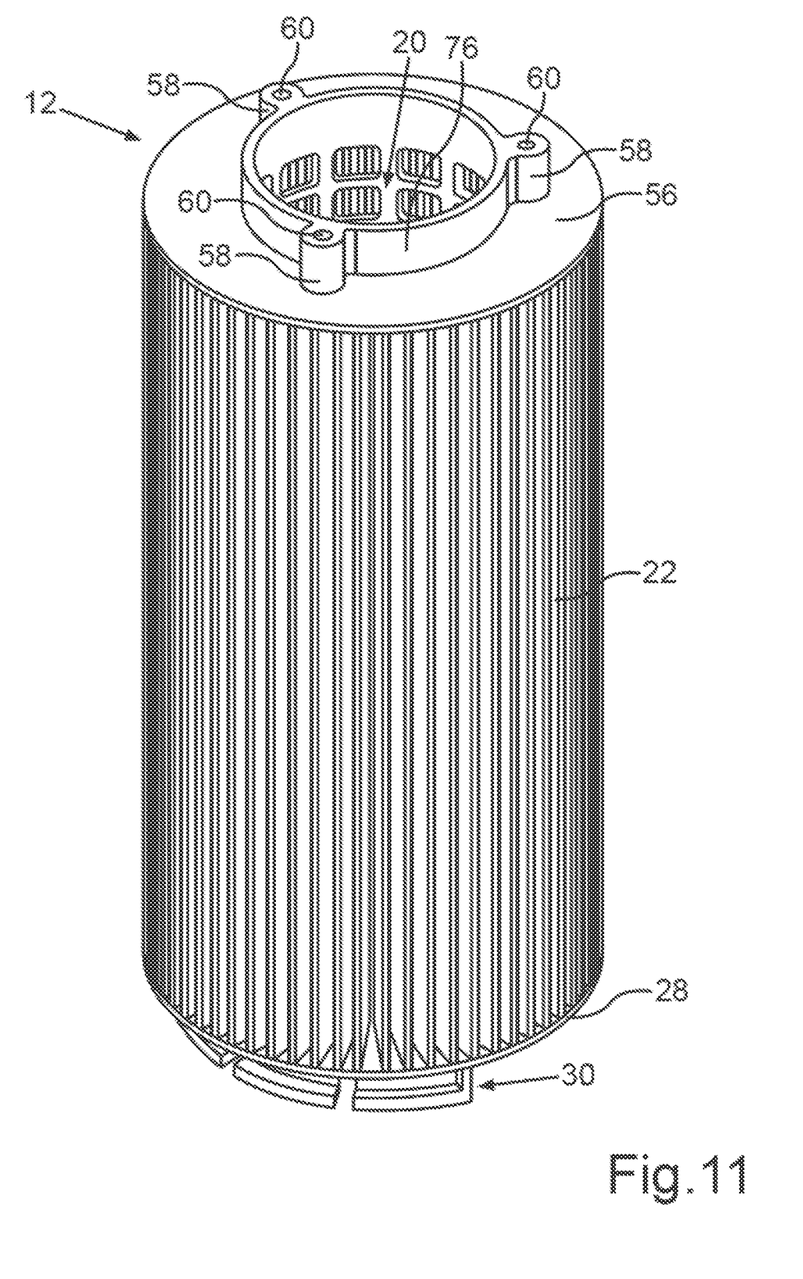
FIG. 11 is a further perspective view of the filter cartridge.

The fluid filter 10 comprises a filter cartridge 12, which is arranged in a filter housing 14 of the fluid filter 10. The filter housing 14 comprises a base body presently formed in the shape of a pot or housing pot 16 and a covering element or a cover 18, by means of which a receiving chamber provided by the housing pot 16 for the filter cartridge 12 is sealed. The filter cartridge 12 presently comprises a channel 20 (c.f. FIG. 11) which is surrounded in the radial direction by a filter material 22. When the filter cartridge 12 does not have such a channel 20, the filter material 22 can be arranged in a receiving chamber of the filter cartridge 12 in a different manner.

Figure 16:
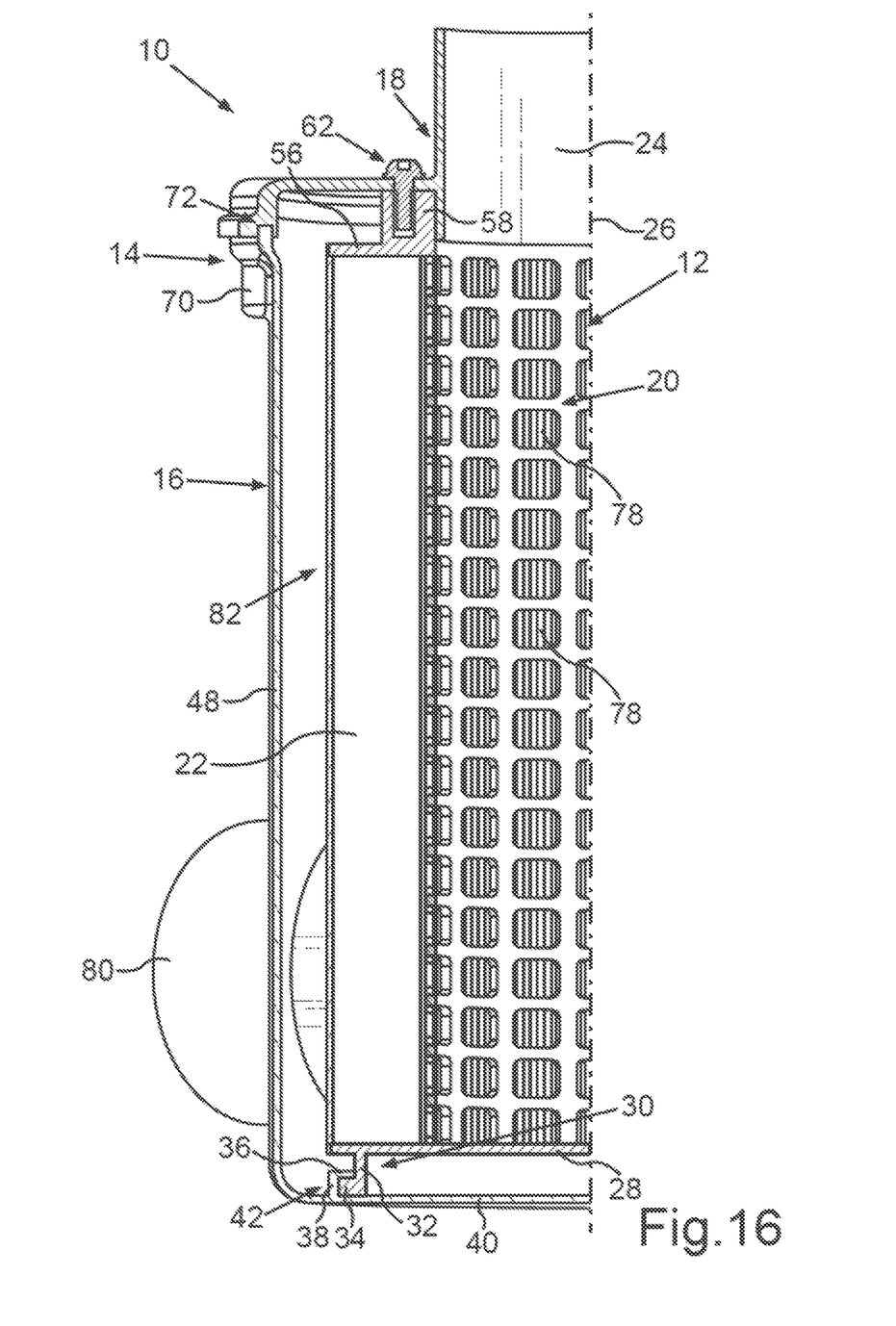
FIG. 16, in sections, shows a sectional depiction of the fluid filter according to FIG. 1.

As presently shown by way of example, the filter material 22 can be formed as a pleated filter. A fluid to be filtered, i.e., in the design of the fluid filter 10 as an air filter, air to be filtered, for example, can emerge out of an annular chamber 82 (c.f. FIG. 16) present inside the filter housing 14 around the filter material 22 into the channel 20 through the filter material 22. The filtered air can then leave the fluid filter 10 via a support 24 of the cover 18.

A longitudinal axis 26 of the channel 20 presently coincides with a longitudinal axis of the filter cartridge 12. By rotating the filter cartridge 12 around this longitudinal axis 26, the filter cartridge 12 can be connected to the housing pot 16 of the filter housing 14. This is to be explained in more detail with reference to the figures below.

Figure 2:
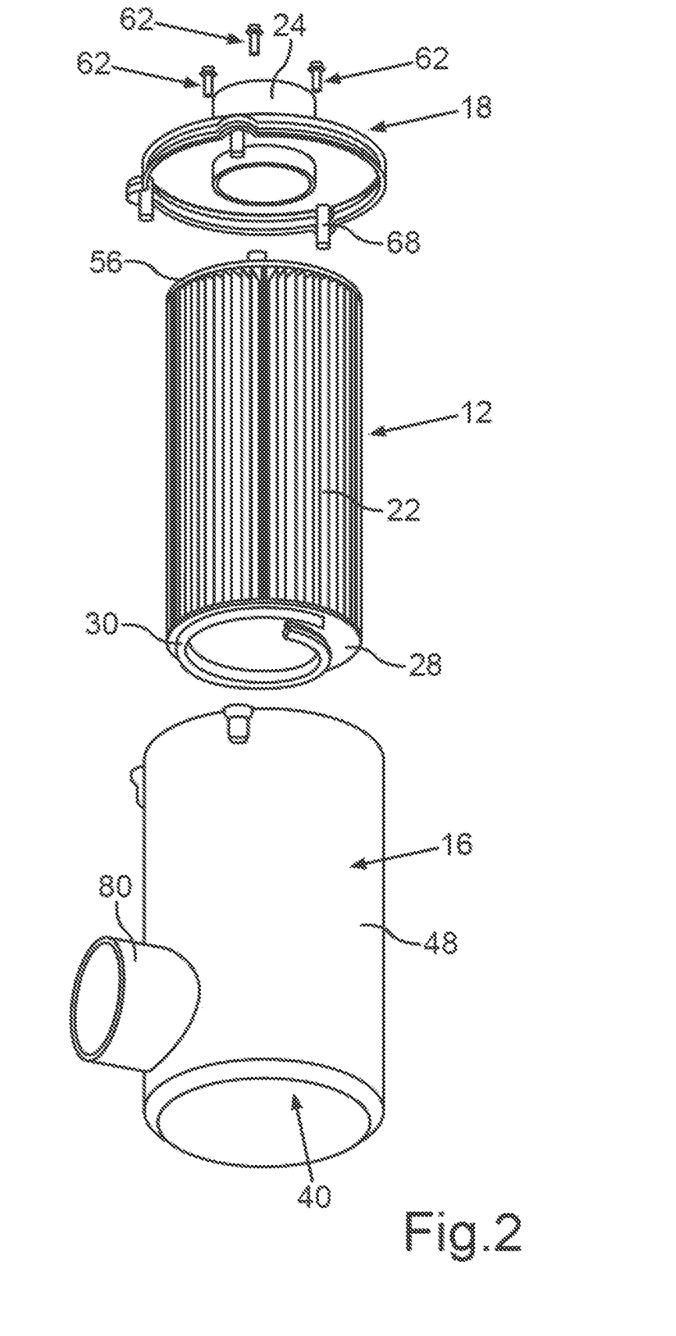
FIG. 2, in an exploded depiction, shows components of the fluid filter according to FIG. 1.

In FIG. 2, the cover 18 is released from the filter cartridge 12 and shown removed from the housing pot 16. Furthermore, it can be seen in FIG. 2, yet even better from FIG. 3, that the filter cartridge 12 has a first, presently lower, end plate 28. A holding element 30 or mounting element is formed integrally with this end plate 28, the holding element having a spiral shape. The components or partial regions of the holding element 30 can be seen better in FIG. 3. Thus, the holding element 30 comprises a wall 32 protruding from the end plate 28 in the direction of the longitudinal axis 26. This wall 32 is formed to be a spiral radially to the longitudinal axis 26. A flange or a web 34 protrudes outwards from the wall 32 in the radial direction. A flat construction of the holding element 30 is achieved by a constant distance of the web 34 from the end plate 28 or by an equally high wall 32 protruding from the end plate 28.

In FIG. 1, the holding element 30 having the spiral shape is shown in a cut-out manner. From this depiction in FIG. 1, it can further be seen easily that, in a mounting position of the filter cartridge 12 shown in FIG. 1, the web 34 of the holding element 30 engages behind a holding web 36, which is provided on sides of the housing pot 16. This holding web 36 protrudes from a wall 38, which is arranged on a base 40 of the housing pot 16. Together with the wall 38, the holding web 36 forms a counter bearing 42 for the holding element 30 of the filter cartridge 12. Presently, this counter bearing 42 is formed integrally with the base 40 of the housing pot 16.

The holding web 36 projects inwardly in the radial direction from the wall 38 of the counter bearing 42. In contrast, the web 34 of the holding element 30 projects outwardly from the wall 32 of the holding element 30 in the radial direction. Correspondingly, in the mounting position of the filter cartridge 12 shown in FIG. 1, the web 34 of the holding element 30 engages behind the holding web 36 of the counter bearing 42.

Figure 3:
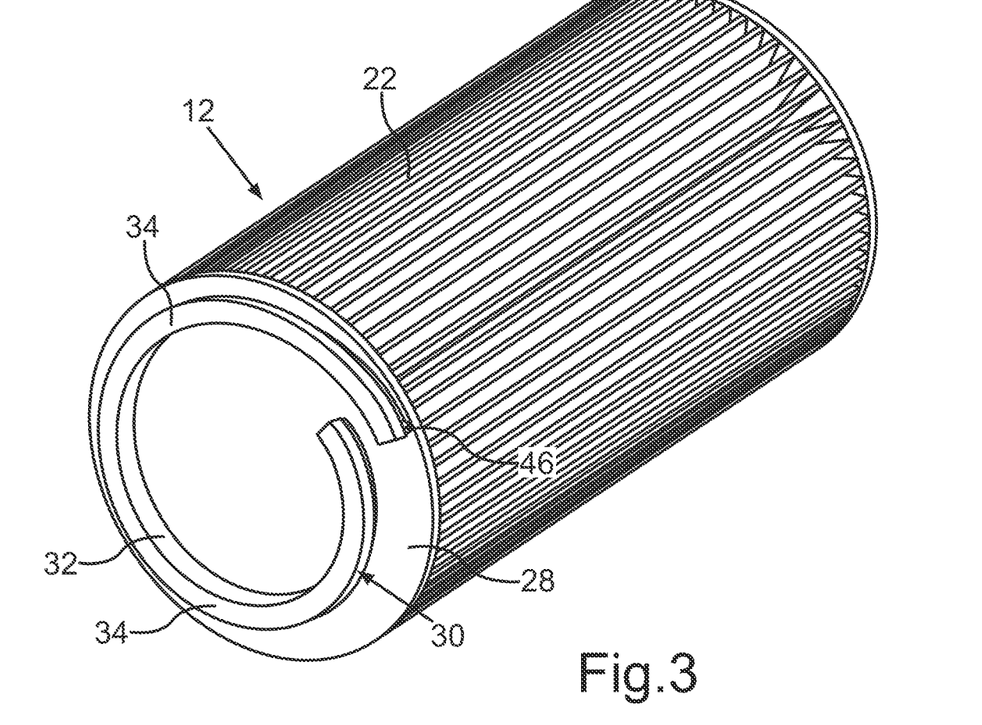
FIG. 3, in perspective, shows a filter cartridge of the fluid filter according to FIG. 1.
Figure 4:
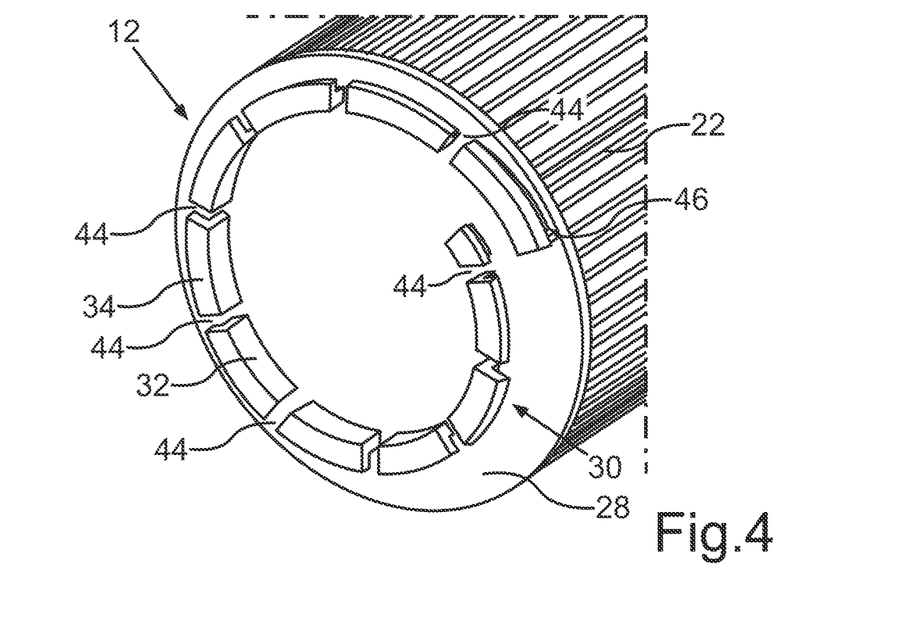
FIG. 4, in sections, shows a variant of the filter cartridge of the fluid filter according to FIG. 1.

In FIG. 4, a variant of the filter cartridge 12 is shown in sections. It can be seen from the depiction in FIG. 4 that the spiral-shaped holding element 30 does not need to be formed continuously. Instead, the holding element 30 can have a plurality of apertures 44 in the peripheral direction of the filter cartridge 12, only some of the apertures being provided with a reference number in FIG. 4. It is further obvious from FIG. 3 and from FIG. 4 that the holding element 30 having the spiral shape presently only has roughly more than one complete winding. This is conducive for a simple mounting of the filter cartridge 12.

Furthermore, it can be seen from FIG. 3 and from FIG. 4 that a stop 46 is formed on an end of the holding element 30. The design of the holding element 30 otherwise having a hooked shape in cross-section is very obvious both from the variant shown in FIG. 3 of the filter cartridge 12 and from the variant shown in FIG. 4 of the filter cartridge 12.

Figure 5:
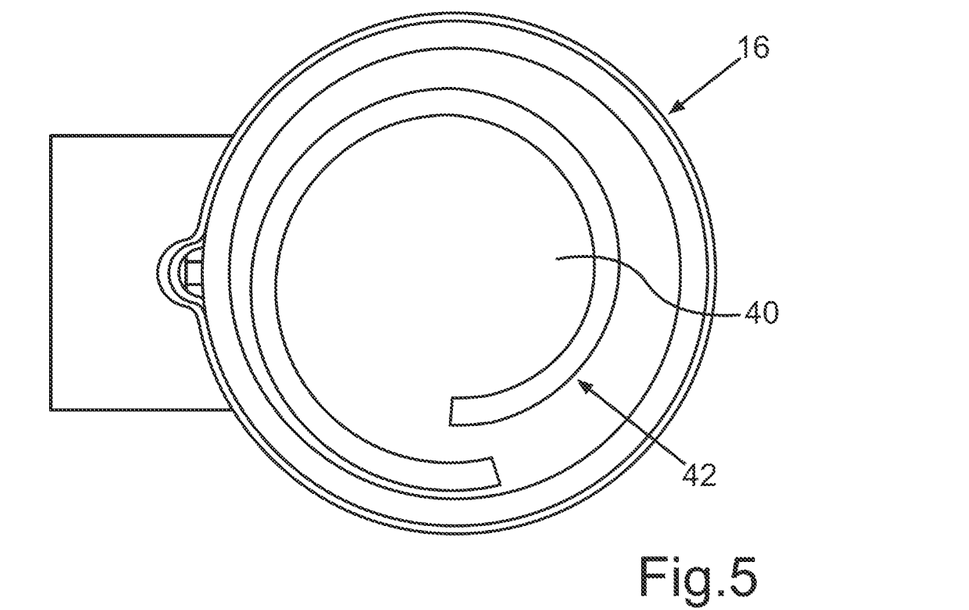
FIG. 5, in a plan view from above, shows a housing pot of a filter housing of the fluid filter according to FIG. 1.

In particular, the spiral shape of the counter bearing 42 can be easily seen from the plan view in the direction of the longitudinal axis 26 of the housing pot 16 in FIG. 5, the counter bearing being formed integrally with the base 40 of the housing pot 16. The spiral-shaped counter bearing 42 also only has about more than one complete winding.

Figure 6:
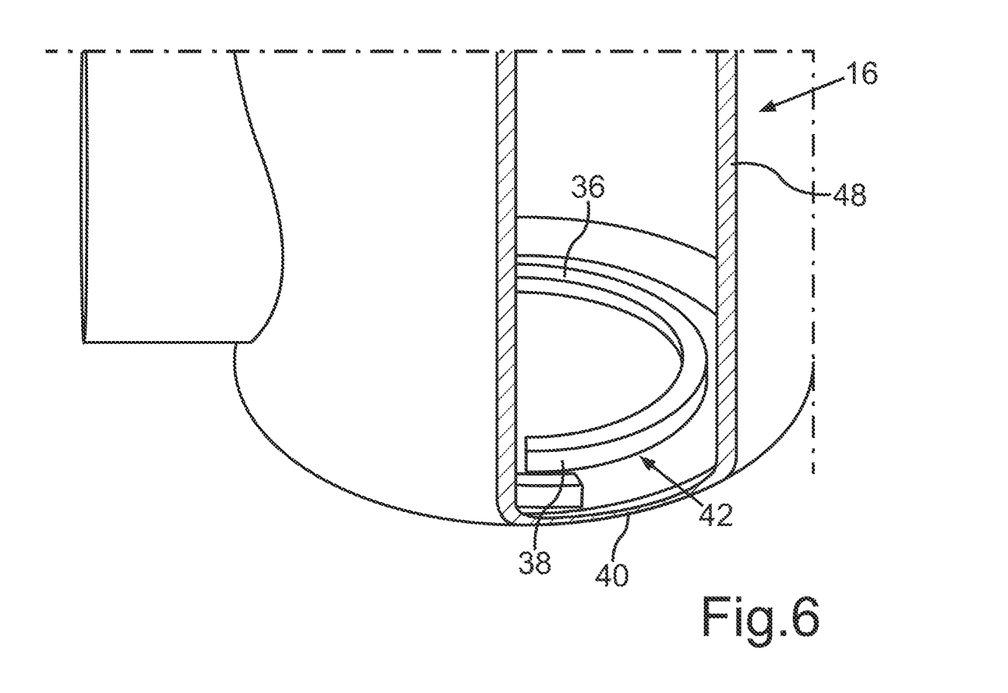
FIG. 6 is a partially cut-out perspective view of the housing pot according to FIG. 5.
Figure 7:
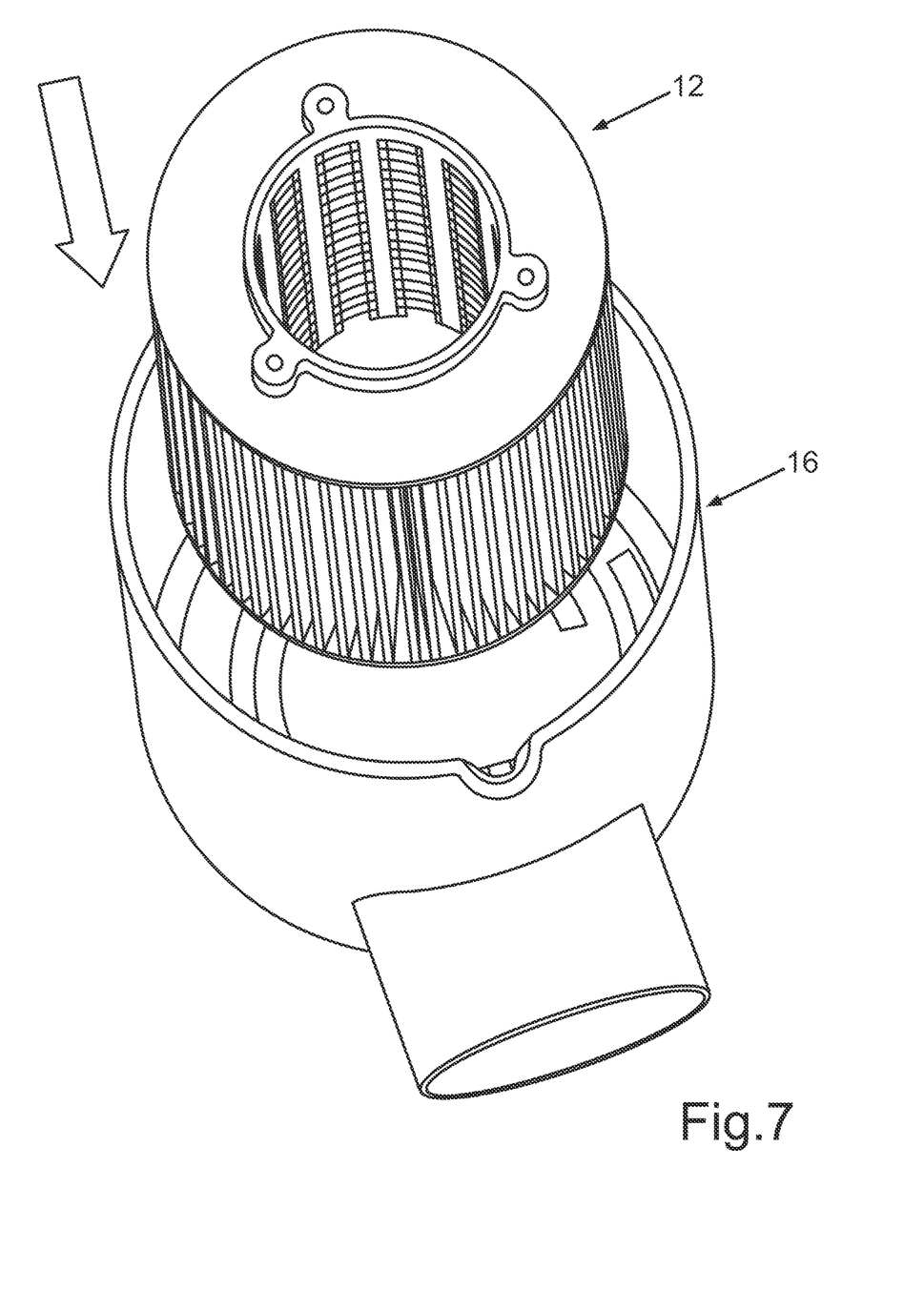
FIG. 7 shows the insertion of the filter cartridge into the housing pot.
Figure 8:
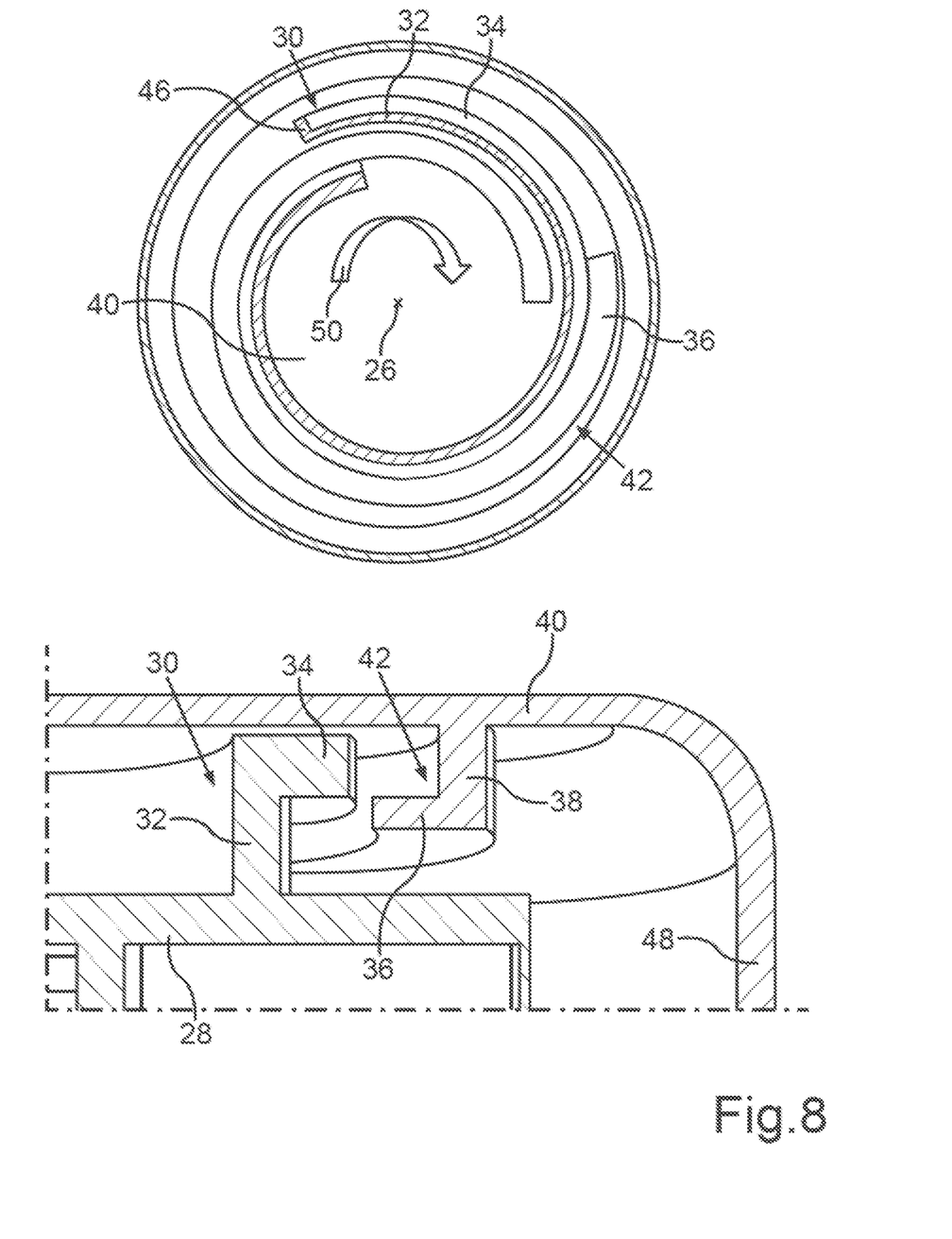
FIG. 8 shows the rotation of the filter cartridge around the longitudinal axis for the purposes of fixing the filter cartridge on the housing pot.

The projection of the holding web 36 from the wall 38 of the counter bearing 42 having the spiral shape inwards in the radial direction can be easily seen in FIG. 6, in which a jacketing wall 48 of the housing pot 16 is shown in cut-out. A flat construction of the counter bearing is achieved by a constant spacing of the holding web 36 from the base 40 of the housing pot 16 or by a comparatively high wall 38 projecting from the base 40.

Now the mounting of the filter cartridge 12 on the housing pot 16 is to be illustrated by means of FIG. 7 to FIG. 10. Firstly, the filter cartridge 12 is accordingly inserted in the housing pot 16 in the direction of the longitudinal axis 26 or in such an in particular pot-shaped lower housing part of the filter housing 14. In an upper depiction in FIG. 8, the holding element 30 is depicted just above the base 40 of the housing pot 16 in a cut-out manner. The web 34 projecting outwardly from the wall 32 of the holding element 30 in the radial direction can thus be seen. This web 34 is in the starting position shown above in FIG. 8 not yep overlapping with the holding web 36 of the counter bearing 42. This can also be easily seen in the sectional depiction shown below in FIG. 8. If, however, the filter cartridge 12 is rotated further around the longitudinal axis 26, as is illustrated in the upper depiction in FIG. 8 by an arrow 50, then the web 34 increasingly reaches overlap with the holding web 36.

Figure 9:
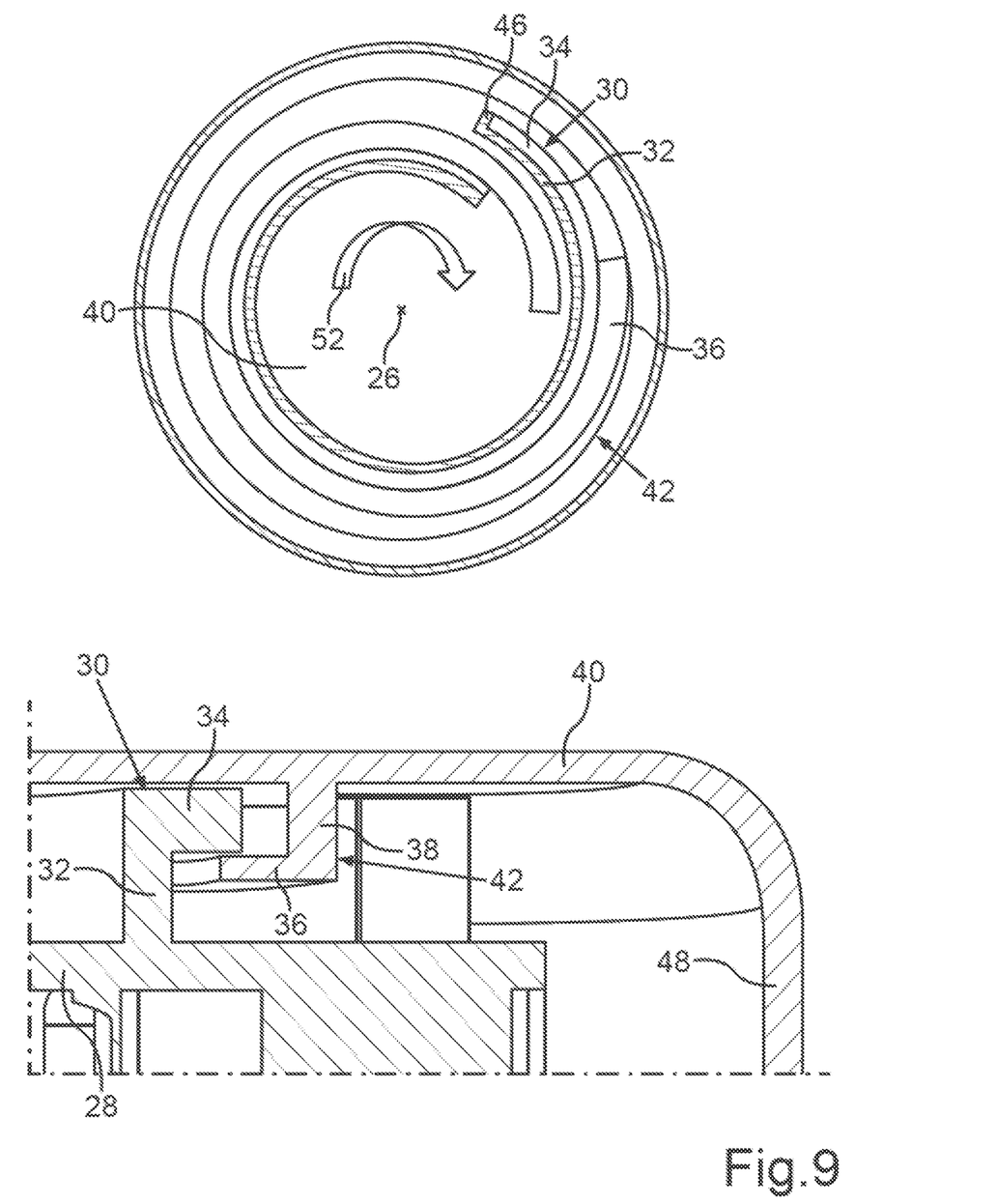
FIG. 9 shows the further rotation of the filter cartridge around the longitudinal axis.

This starting hooking of the filter cartridge 12 or the filter element with the base 40 or housing base is illustrated in FIG. 9. Thus, according to the upper depiction in FIG. 9, the web 34 already engages a little further behind the holding web 36. Now, the filter cartridge 12 is rotated further around the longitudinal axis 26, as is illustrated in the upper depiction in FIG. 9 by a further arrow 52. It is also obvious from the lower depiction in FIG. 9 that the web 34 already engages a little further behind the holding web 36 of the counter bearing 42 due to the further rotation of the filter cartridge 12.

Figure 10:
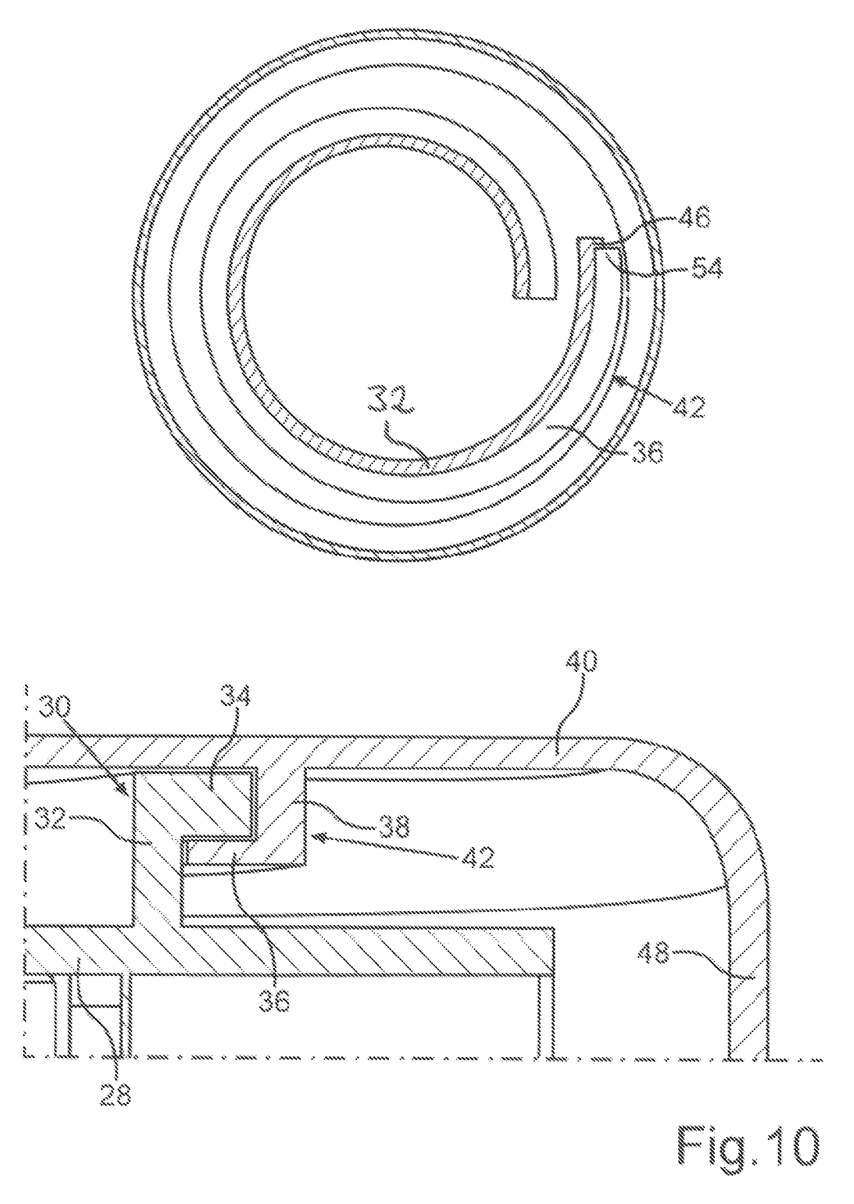
FIG. 10 shows the filter cartridge brought into its mounting position in the housing pot by rotation.

The situation is now shown in FIG. 10 in which the filter cartridge 12 is brought into its mounting position and is hooked with the base 40. In this mounting position, the stop 46 of the holding element 30 abuts on an external end 54 of the counter bearing 42. Thus, when the spiral-shaped holding element 30 is brought into the mounting position by rotating around the longitudinal axis 26, then the filter cartridge 12 is also aligned in a desired orientation in relation to the cover 18 of the filter housing 14. The cover 18 can then be screwed together with the filter cartridge 12. Furthermore, it can be seen in the upper depiction in FIG. 10 that the web 34 of the holding element 20 is preferably completely covered by the holding web 36 of the counter bearing 42 in the mounting position of the filter cartridge 12.

As can be easily seen in FIG. 11, in particular, the filter cartridge 12 has a further or second, presently upper end plate 56 in an end region opposite the holding element 30 for the mounting of the cover 18. Screwing bases 58 (presently three) are formed integrally with this end plate 56 which have fixing eyes in the form of holes 60. The holes 60, which are preferably formed as blind holes, can have a thread. However, it can also be provided that a thread is formed in the respective screw base 58 in the region of the hole 60 when screwing in fixing elements in the form of fixing screws 62, which are shown in FIG. 12, for example.

Figure 12:
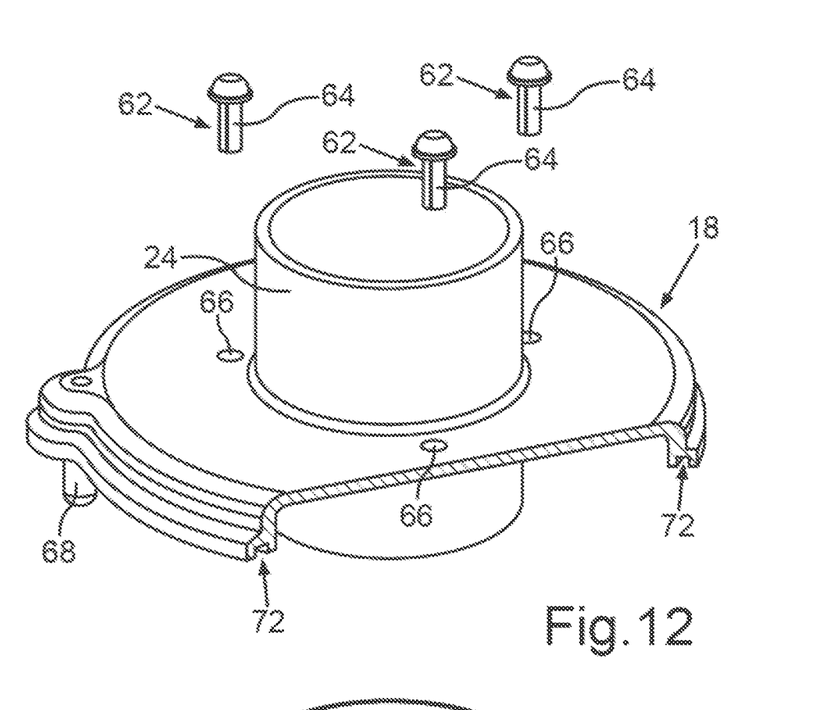
FIG. 12, partially cut-away, shows a covering element of the filter housing and fixing screws for fixing of the covering element on the filter cartridge.

It is further obvious from FIG. 12 that a respective shaft 64 of the fixing screws 62 is guided through passage openings 66 for fixing the cover 18 on the filter cartridge 12, the passage openings being formed in the cover 18. It is thus ensured by screwing the cover 18 to the filter cartridge 12 that the cover 18 is fixed on the housing pot 16. In order to align the cover 18 in relation to the filter cartridge 12 in such a way that the shafts 64 of the fixing screws 62 can be guided through the passage openings 66 and introduced into the holes 60, a pin-shaped protrusion 68 is presently formed on the cover 18. This pin-shaped protrusion 68 is introduced into a receiver 70 designed in the manner of a bulge which is formed in the jacketing wall 48 of the housing pot 16 (see also FIG. 13). An anti-twisting device for the cover 18 is provided by the pin-shaped protrusion 68 by interacting with the receiver 70.

Figure 13:
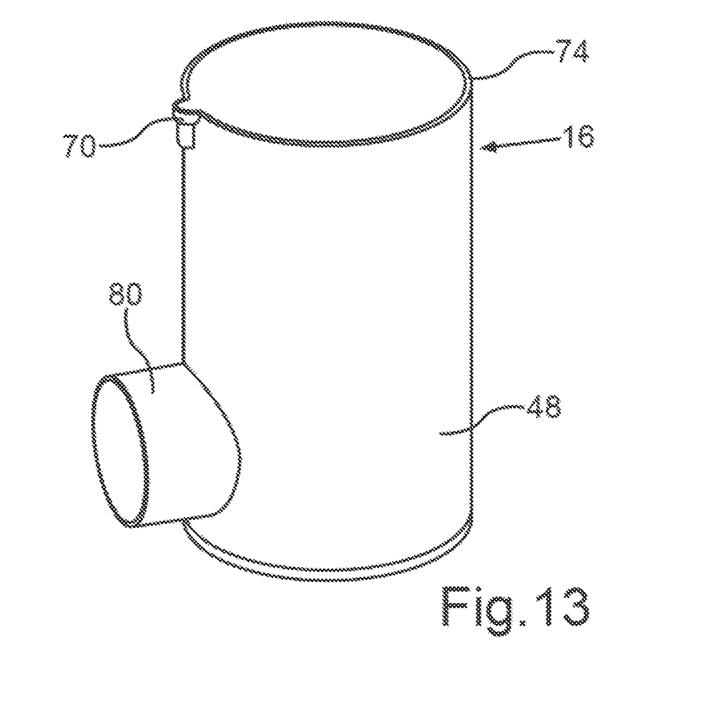
FIG. 13 is a further perspective view of the housing pot of the filter housing.

Furthermore, when looking at FIG. 12 and FIG. 13 together, it is obvious that a groove 72 is formed on an edge of the cover 18. When the cover 18 is mounted on the housing pot 16, then a front-end edge 74 of the jacketing wall 48 is received in this grove 72.

Figure 14:
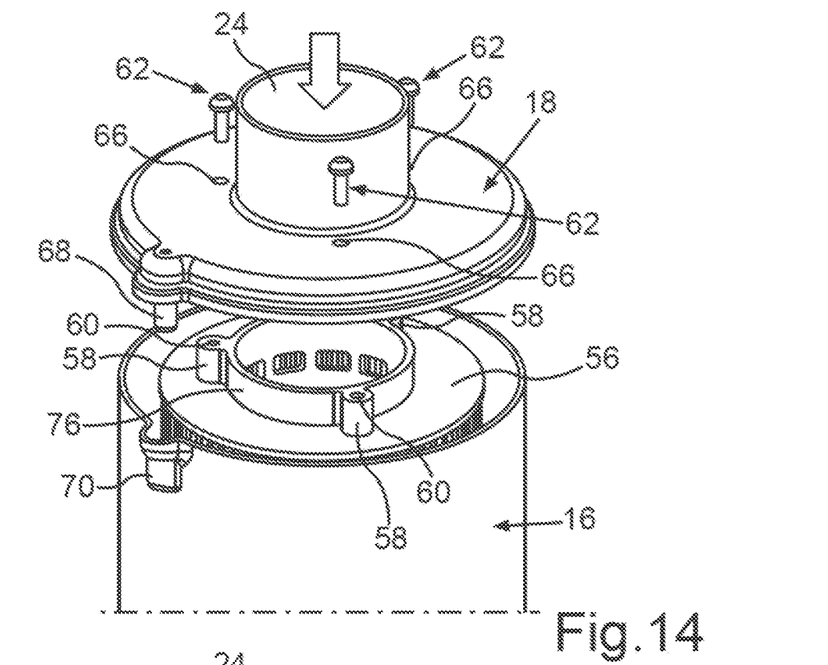
FIG. 14 shows the application of the covering element on the housing pot, wherein the filter cartridge is received in the housing pot, and wherein the fixing screws are screwed into screw bases which are formed on the filter cartridge.

It is illustrated in FIG. 14 how the cover 18 is placed on the housing pot 16 from above. In doing so, the cover 18 is aligned by inserting the protrusion 68 into the receiver 70 in such a way that the passage openings 66 formed in the cover 18 are flush with the holes 60 of the screwing base 58. Moreover, it can be seen from FIG. 14 that an end region 76 of the channel 20 projects beyond the second end plate 56 in the direction of the longitudinal axis 26. An end of the tubular support 24 can be introduced into this end region 76.

Figure 15:
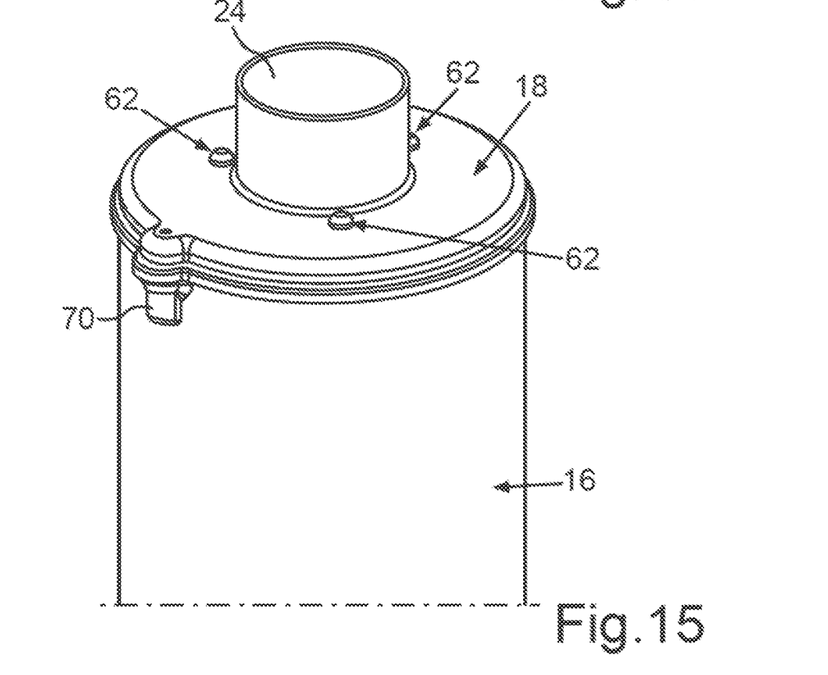
FIG. 15 shows the fluid filter with closed covering element.

FIG. 15 shows how the cover 18 is connected to the housing pot 16 in a tightly placed manner by the fixing screws 62 being tightened.

It is particularly obvious from the sectional depiction of the fluid filter 10 in FIG. 16 that the channel 20 is presently formed as a support tube, which is surrounded by the filter material 22. This support tube or support cage has a plurality of passage openings 78 via which the fluid or medium to be filtered can reach the inside of the channel 20. Furthermore, it can be seen in FIG. 16 how the filter element or the filter cartridge 12 is hooked with the base 40 or the counter bearing 42 when the cover 18 is mounted on the filter cartridge 12.

Moreover, FIG. 16 explains that the channel 20 is strained by tension. This is because the fixing screws 62, which are screwed into the holes 60 formed in the screwing base 58, press the cover 18 against the housing pot 16 on the one hand. On the other hand, the web 34 of the holding element 30 is pulled against the holding web 36 of the counter bearing 42 in the direction of the longitudinal axis 26 by tightening the fixing screws 62. Furthermore, the front-end edge 74 of the jacketing wall 48 of the housing pot 16 is pulled into the groove 72 which is formed on the edge of the cover 18. The cover 18 and the housing pot 16 are thus pressed together in the region of a sealing surface formed in the groove 72.

Furthermore, it can be seen from FIG. 16 that the housing pot 16 can have a support 80 which is presently formed in the jacketing wall 48. The fluid or medium to be filtered can be supplied to the annular chamber 82 via this support 80, the annular chamber surrounding the filter material 22 of the filter cartridge 12 in the filter housing 14 of the fluid filter 10.

The invention claimed is:

1. A fluid filter for a motor vehicle, comprising:
   a filter housing; and
   a filter cartridge which is disposable in the filter housing;
   wherein the filter housing comprises a housing pot and a covering element, wherein the filter cartridge has a filter material, and wherein the filter cartridge is connectable to the housing pot of the filter housing by rotating around a longitudinal axis of the filter cartridge;
   wherein a spiral shaped holding element is disposed on an end plate of the filter cartridge, wherein the holding element has a first wall that protrudes perpendicularly from the end plate in a direction of the longitudinal axis and wherein the holding element has a web that protrudes perpendicularly from the first wall and that projects outwardly in a radial direction from the first wall;
   wherein the web of the holding element is engageable behind a holding web of a spiral shaped counter bearing disposed on the housing pot in a mounting position of the filter cartridge, wherein the counter bearing has a second wall that protrudes perpendicularly from a base of the housing pot in the direction of the longitudinal axis and wherein the holding web of the counter bearing protrudes perpendicularly from the second wall and projects inwardly in the radial direction from the second wall.

2. The fluid filter according to claim 1, wherein the counter bearing is formed integrally with the base of the housing pot.

3. The fluid filter according to claim 1, wherein the housing pot has a receiver for a protrusion disposed on the covering element and wherein a mounting orientation of the covering element in relation to the housing pot is predetermined by the protrusion engaging in the receiver.

4. The fluid filter according to claim 1, wherein a groove is formed on the covering element and wherein a front-end edge of a wall of the housing pot is received in the groove when the covering element is mounted on the housing pot.

5. A filter cartridge for a fluid filter of a motor vehicle which is disposable in a filter housing of the fluid filter, wherein the filter housing comprises a housing pot and a covering element, comprising:
   a filter material;
   wherein the filter cartridge is connectable to the housing pot of the filter housing by rotating around a longitudinal axis of the filter cartridge;
   an end plate; and
   a spiral shaped holding element disposed on the end plate, wherein the holding element has a first wall that protrudes perpendicularly from the end plate in a direction of the longitudinal axis and wherein the holding element has a web that protrudes perpendicularly from the first wall and that projects outwardly in a radial direction from the first wall;
   wherein the web of the holding element is engageable behind a holding web of a spiral shaped counter bearing disposed on the housing pot in a mounting position of the filter cartridge, wherein the counter bearing has a second wall that protrudes perpendicularly from a base of the housing pot in the direction of the longitudinal axis and wherein the holding web of the counter bearing protrudes perpendicularly from the second wall and projects inwardly in the radial direction from the second wall;
   wherein a distance of the web of the holding element from a surface of the end plate facing away from the filter material is constant in a peripheral direction of the filter cartridge.

6. The filter cartridge according to claim 5, wherein the filter cartridge has at least one fixing eye in an end region lying opposite the holding element, wherein a fixing element is introducible into the at least one fixing eye for fixing the covering element on the filter cartridge, and wherein the fixing element is guidable through a through opening formed in the covering element.

7. The filter cartridge according to claim 6, wherein the at least one fixing eye has a thread and comprises a blind hole formed in a base.

8. The filter cartridge according to claim 7, wherein the base is formed integrally with a further end plate of the filter cartridge and wherein the further end plate has a passage corresponding to a channel of the filter cartridge.

9. The filter cartridge according to claim 6, wherein the filter cartridge has a plurality of fixing eyes equally spaced apart from one another in the peripheral direction of the filter cartridge.

10. The filter cartridge according to claim 5, wherein a curvature radius of the holding element increases from a center of a spiral shape of the wall of the holding element towards an edge of the spiral shape.

11. The filter cartridge according to claim 5, wherein the holding element is formed integrally with the end plate of the filter cartridge and wherein the end plate is formed closed.

12. The filter cartridge according to claim 5, wherein a stop is formed on an outer end of the holding element and wherein the stop is engageable with an outer end of the counter bearing by rotating the filter cartridge around the longitudinal axis.

13. The filter cartridge according to claim 5, wherein a channel of the filter cartridge is formed as a support tube having a plurality of through openings.

14. The filter cartridge according to claim 5, wherein an end region of a channel of the filter cartridge projects beyond a further end plate of the filter cartridge in the direction of the longitudinal axis and wherein a tubular support of the covering element is introducible into the end region of the channel.

15. The filter cartridge according to claim 5, wherein the holding element has a plurality of apertures in the peripheral direction of the filter cartridge.

* * * * *